(12) United States Patent
Fujiwara et al.

(10) Patent No.: US 10,658,126 B2
(45) Date of Patent: May 19, 2020

(54) CAPACITOR ELECTRODE MATERIAL, METHOD FOR PRODUCING SAME, AND ELECTRIC DOUBLE LAYER CAPACITOR

(71) Applicants: SEKISUI CHEMICAL CO., LTD., Osaka, Osaka (JP); OITA UNIVERSITY, Oita, Oita (JP)

(72) Inventors: Akihiko Fujiwara, Osaka (JP); Shoji Nozato, Osaka (JP); Akira Nakasuga, Osaka (JP); Shunji Hyodo, Osaka (JP); Hiroshi Yoshitani, Osaka (JP); Masahiro Toyoda, Oita (JP)

(73) Assignees: SEKISUI CHEMICAL CO., LTD., Osaka (JP); OITA UNIVERSITY, Oita (JP)

( * ) Notice: Subject to any disclaimer, the term of this patent is extended or adjusted under 35 U.S.C. 154(b) by 633 days.

(21) Appl. No.: 14/914,618

(22) PCT Filed: Dec. 19, 2014

(86) PCT No.: PCT/JP2014/083733
§ 371 (c)(1),
(2) Date: Feb. 25, 2016

(87) PCT Pub. No.: WO2015/098758
PCT Pub. Date: Jul. 2, 2015

(65) Prior Publication Data
US 2016/0358718 A1 Dec. 8, 2016

(30) Foreign Application Priority Data
Dec. 26, 2013 (JP) ................................ 2013-269472

(51) Int. Cl.
| H01G 11/38 | (2013.01) |
| H01G 11/44 | (2013.01) |
| H01G 11/86 | (2013.01) |
| C01B 32/225 | (2017.01) |
| H01G 11/34 | (2013.01) |

(52) U.S. Cl.
CPC ........... *H01G 11/38* (2013.01); *C01B 32/225* (2017.08); *H01G 11/44* (2013.01); *H01G 11/86* (2013.01); *H01G 11/34* (2013.01); *Y02E 60/13* (2013.01)

(58) Field of Classification Search
CPC ........ H01G 11/38; H01G 11/34; H01G 11/44; H01G 11/86; Y02E 60/13; C01B 32/225
See application file for complete search history.

(56) References Cited

U.S. PATENT DOCUMENTS

| 7,623,340 B1* | 11/2009 | Song ..................... B82Y 30/00 361/502 |
| 2009/0059474 A1 | 3/2009 | Zhamu et al. |
| 2009/0092747 A1 | 4/2009 | Zhamu et al. |
| 2009/0135548 A1 | 5/2009 | Yoshio et al. |
| 2011/0286147 A1 | 11/2011 | Chen et al. |
| 2013/0037756 A1 | 2/2013 | Kim et al. |
| 2013/0052526 A1 | 2/2013 | Momo et al. |
| 2013/0296498 A1* | 11/2013 | Nakasuga ................. C08F 2/44 525/330.3 |
| 2014/0080950 A1 | 3/2014 | Wada et al. |
| 2015/0175778 A1 | 6/2015 | Nozato et al. |
| 2015/0270534 A1* | 9/2015 | Nozato ................. H01M 4/133 429/217 |

FOREIGN PATENT DOCUMENTS

| CN | 101841019 A | 9/2010 | |
| JP | 2001-243943 A | 9/2001 | |
| JP | 2007-243042 A | 9/2007 | |
| JP | 2008-42182 A | 2/2008 | |
| JP | 2012-107233 A1 | 6/2012 | |
| JP | 2013-42134 A | 2/2013 | |
| JP | 2013-65837 A | 4/2013 | |
| JP | 2013-12591 A | 6/2013 | |
| JP | 5352028 B1 | 11/2013 | |
| WO | WO-2012105344 A1 * | 8/2012 | ................ C08F 2/44 |
| WO | WO-2014136609 A1 * | 9/2014 | .......... H01M 4/1395 |

OTHER PUBLICATIONS

P. Nemes-Incze; Z. Osvath; K. Kamaras; L.P. Biro. Anomalies in thickness measurements of graphene and few layer graphite crystals by tapping mode atomic force microscopy. Carbon 46 (2008) p. 1435-1442. (Year: 2008).*
International Search Report for the Application No. PCT/JP2014/083733 dated Mar. 17, 2015.
Written Opinion of the International Searching Authority (PCT/ISA/237) for Application No. PCT/JP2014/083733 dated Mar. 17, 2015.
Supplementary European Search Report for the Application No. EP 14 87 4164 dated Oct. 11, 2017.
Written Opinion of the International Searching Authority (PCT/ISA/237) for Application No. PCT/JP2014/083733 dated Mar. 17, 2015 (English Translation mailed Jul. 7, 2016).

* cited by examiner

*Primary Examiner* — Christopher M Rodd
(74) *Attorney, Agent, or Firm* — Cheng Law Group, PLLC

(57) ABSTRACT

There is provided a capacitor electrode material that does not require the use of a conductive aid and can increase the capacitance of an electric double layer capacitor. A capacitor electrode material comprising resin-remaining partially exfoliated graphite obtained by pyrolyzing a resin in a composition in which the resin is fixed to graphite or primary exfoliated graphite by grafting or adsorption, the resin-remaining partially exfoliated graphite having a structure in which graphite is partially exfoliated, with part of the resin remaining; and a binder resin.

10 Claims, 10 Drawing Sheets

[FIG. 1]
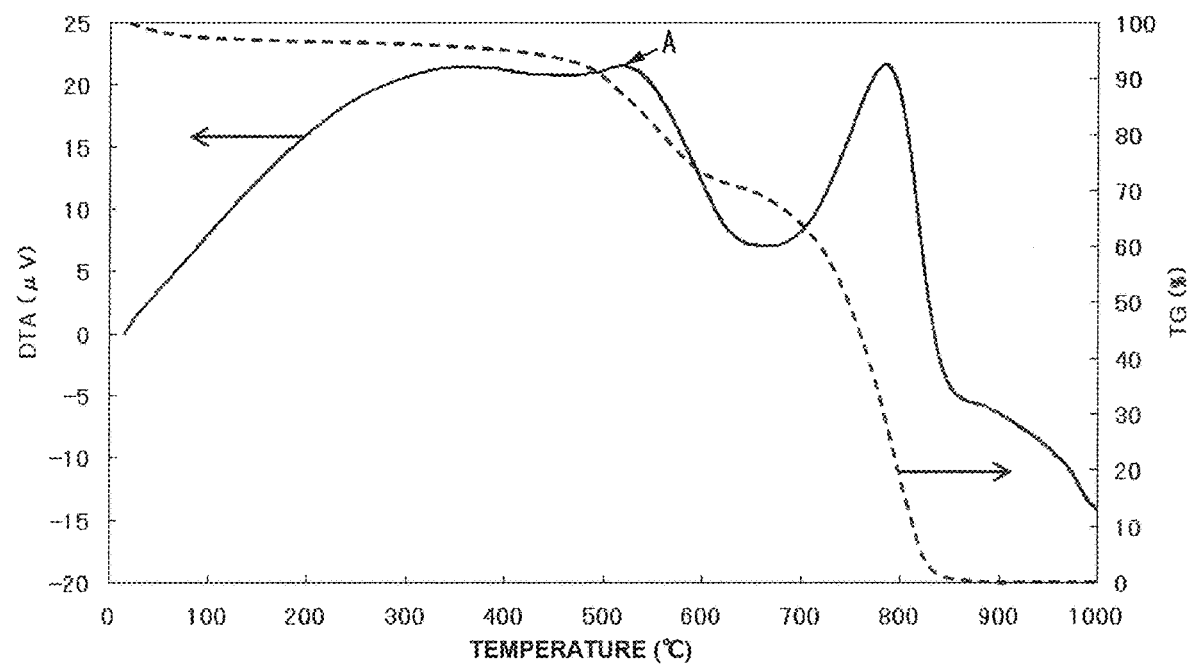
[FIG. 2]
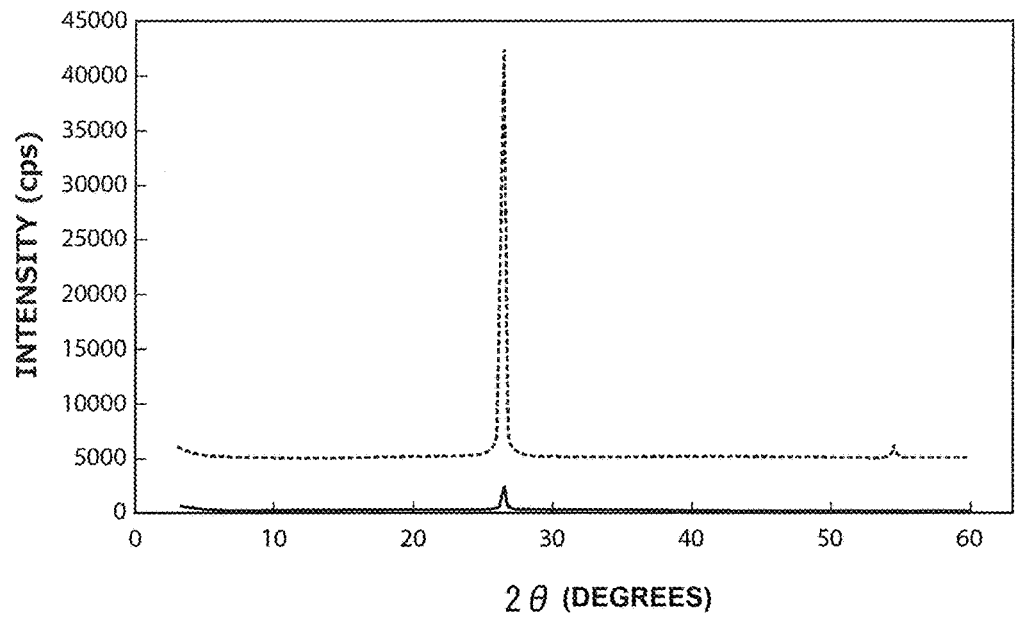

[FIG. 3]
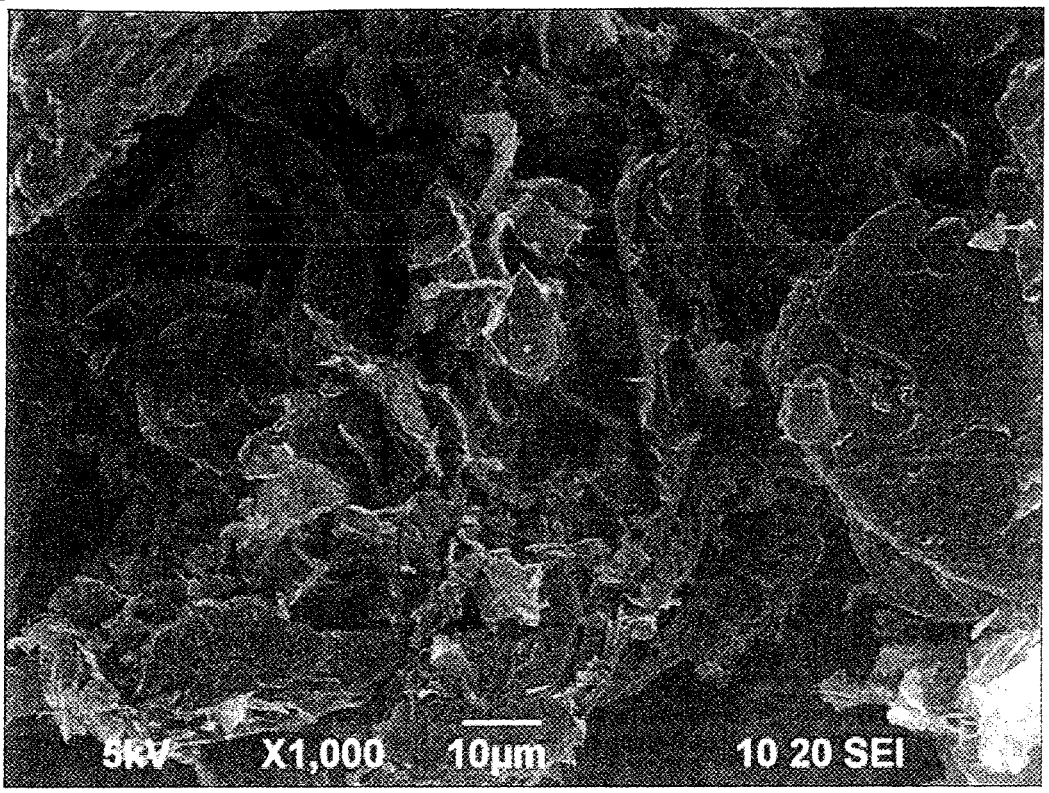
[FIG. 4]
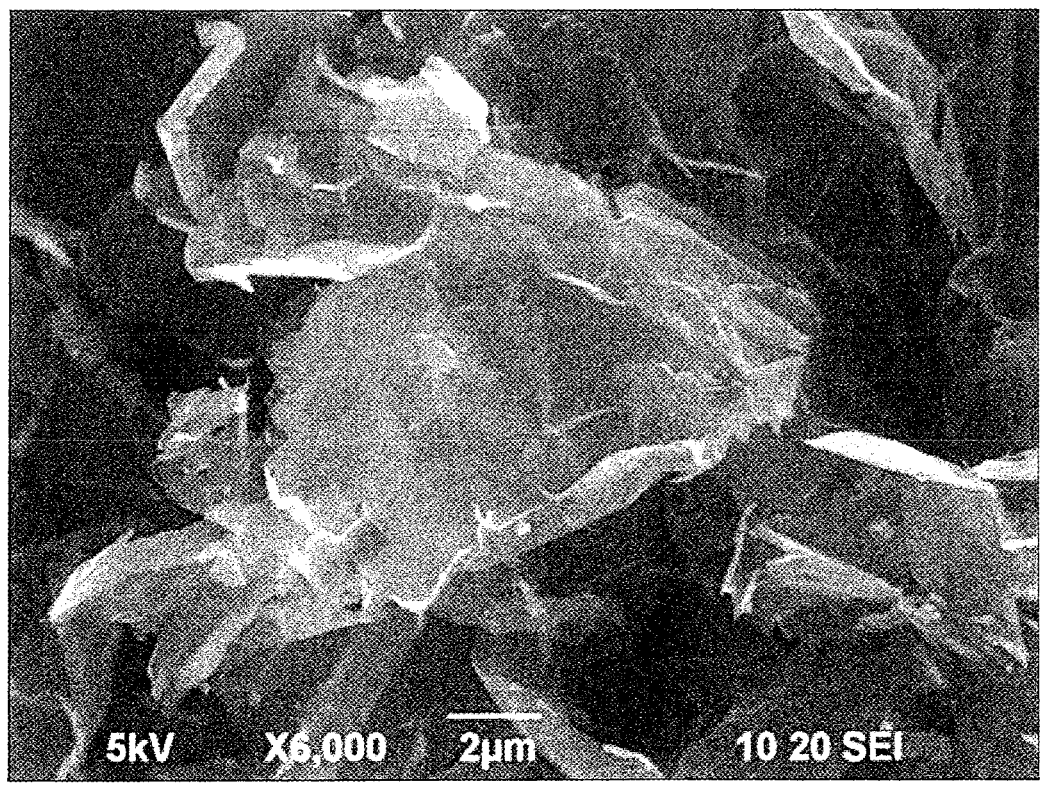

[FIG. 5]
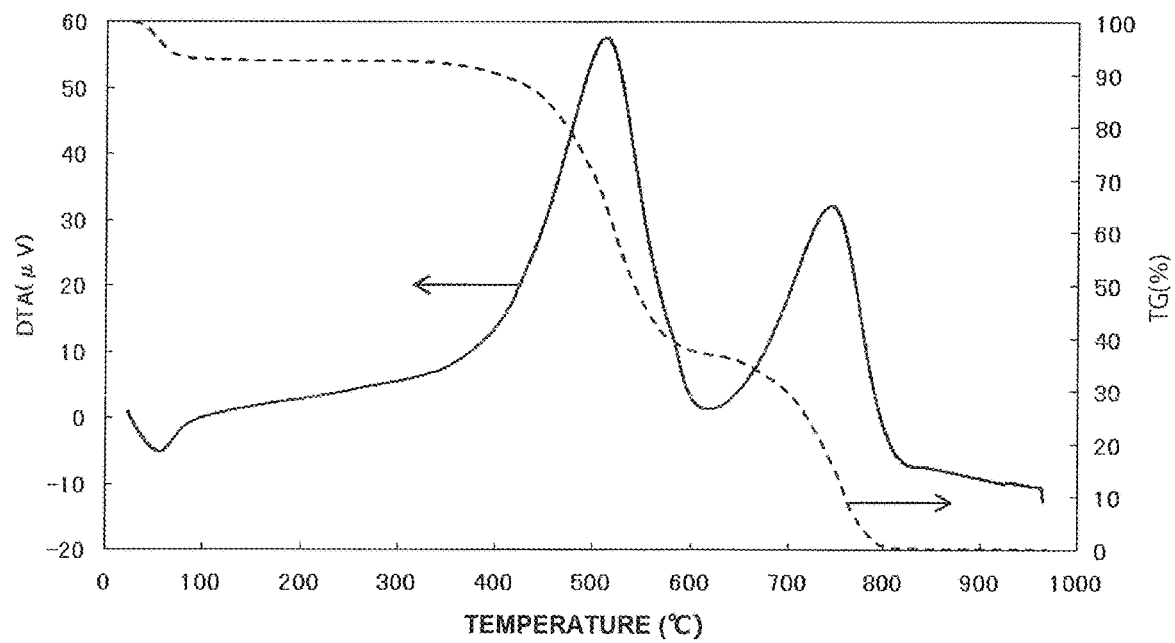
[FIG. 6]
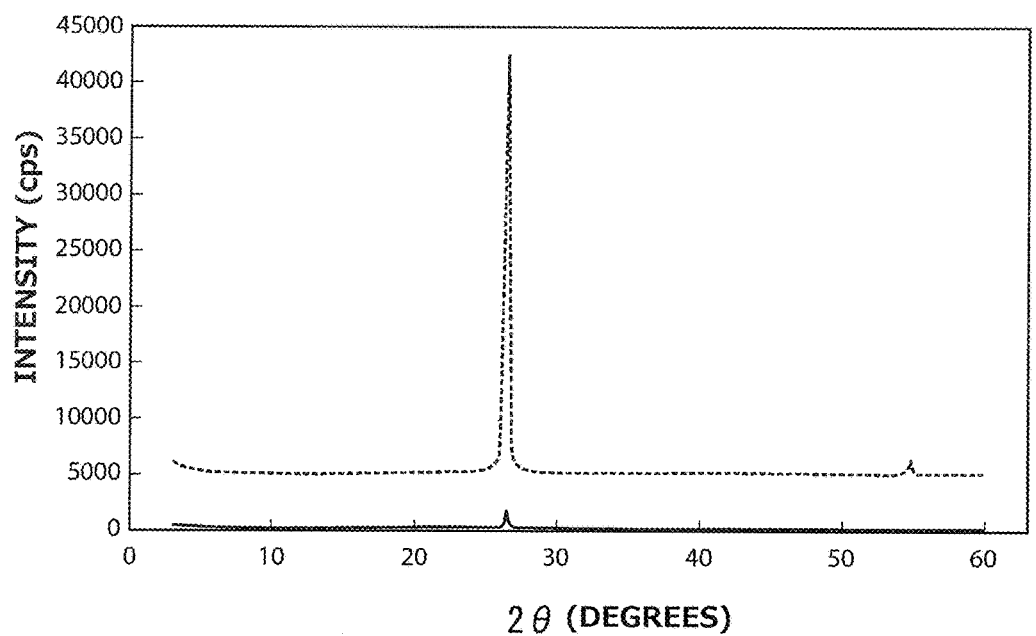

[FIG. 7]
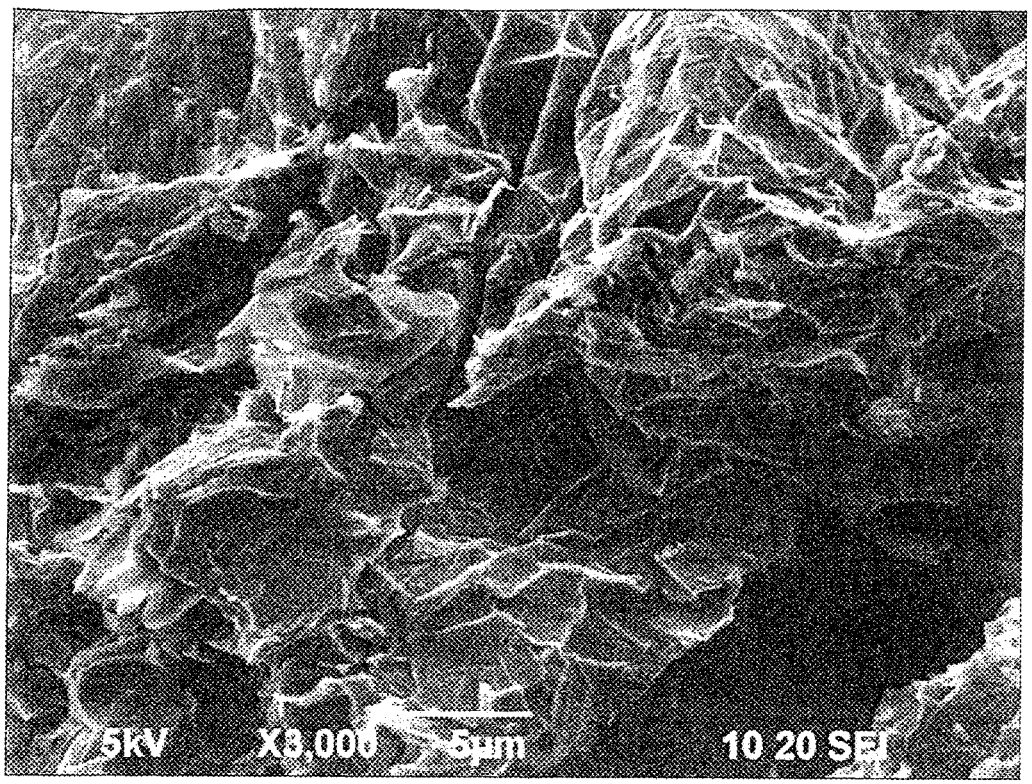
[FIG. 8]
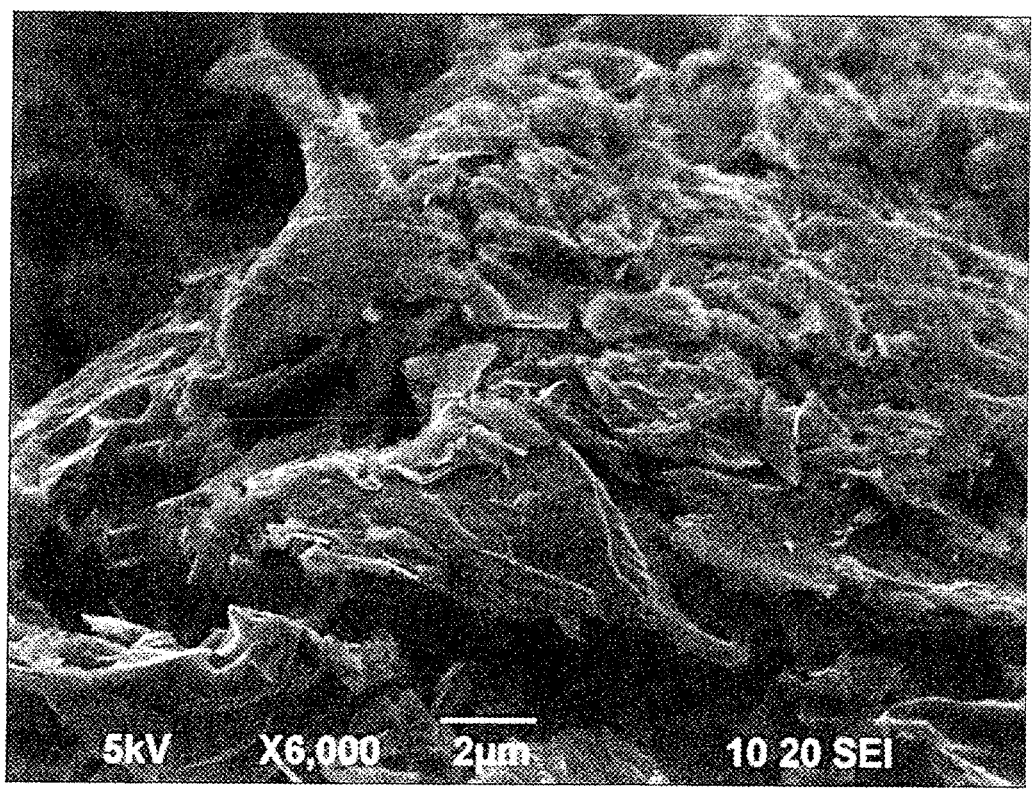

[FIG. 9]
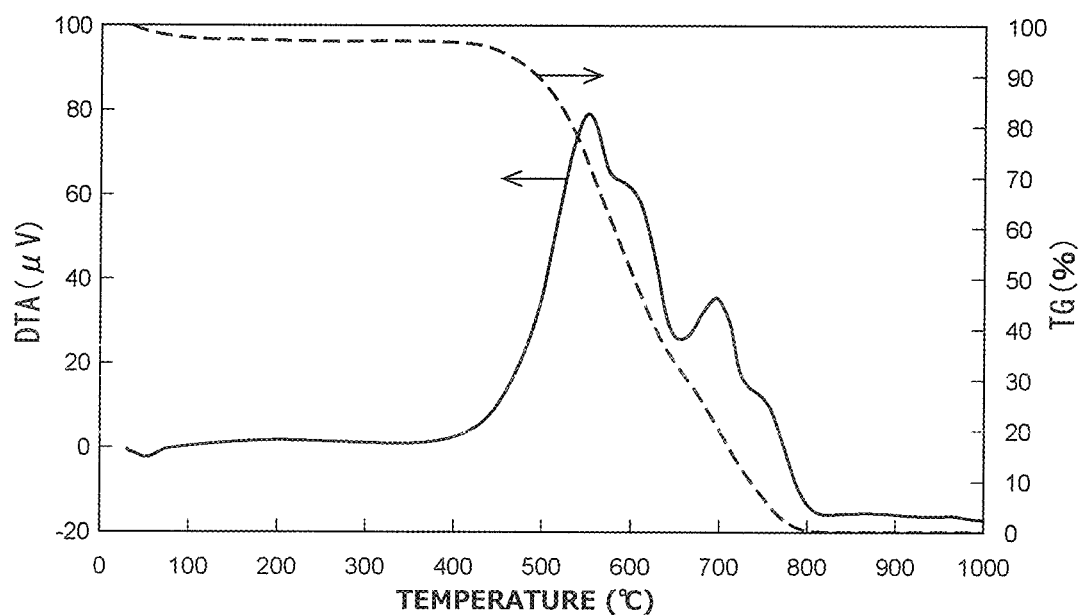
[FIG. 10]
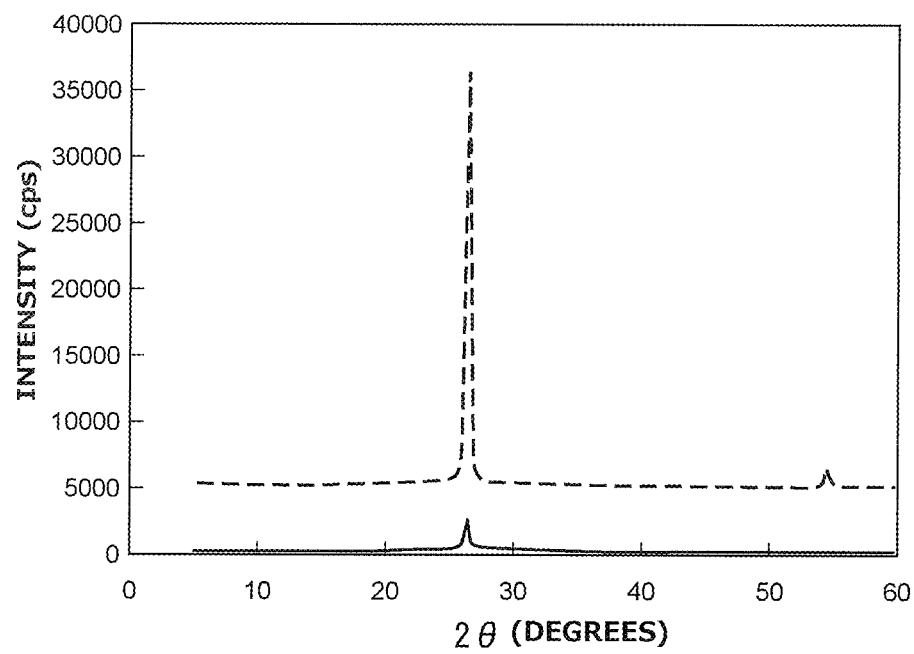

[FIG. 11]
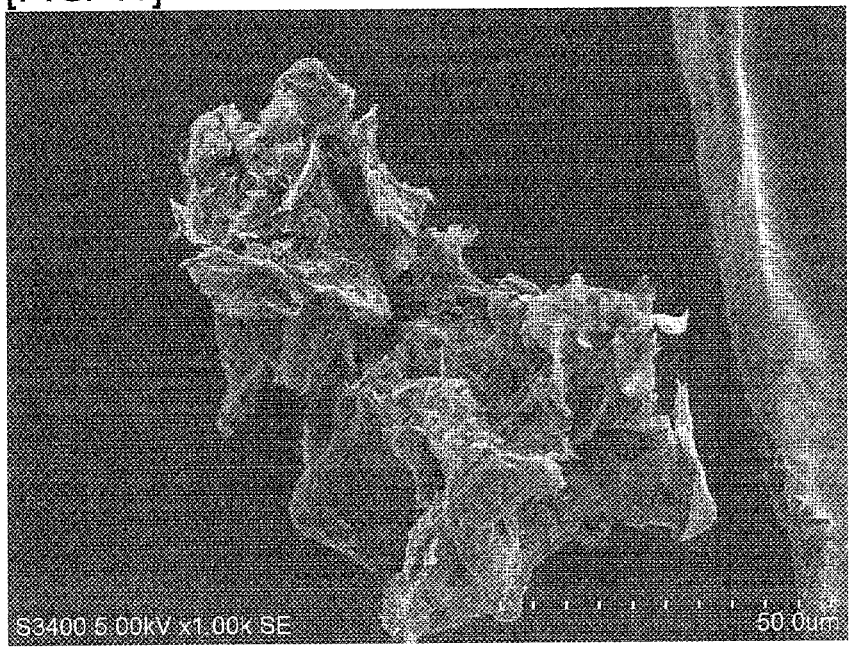
[FIG. 12]
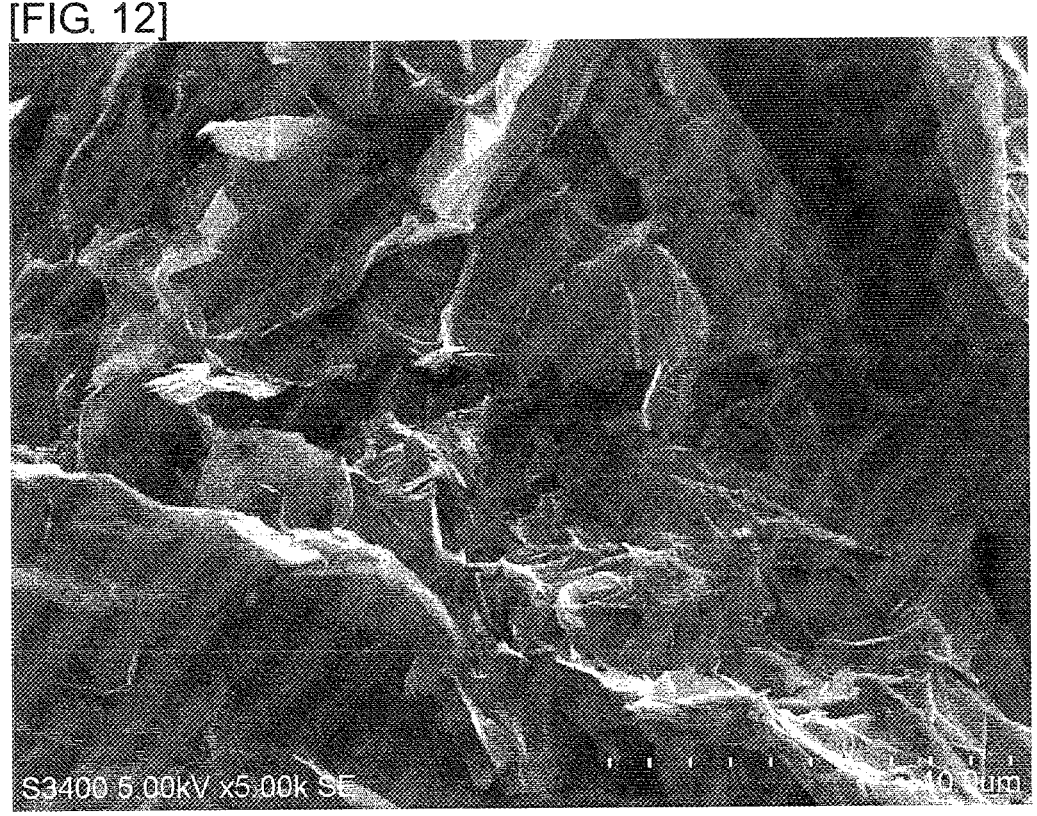

[FIG. 13]
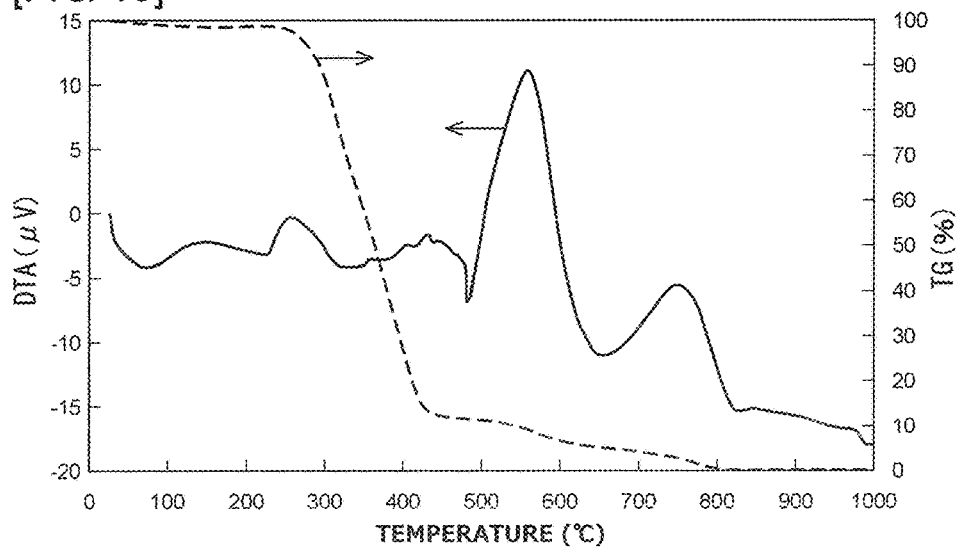
[FIG. 14]
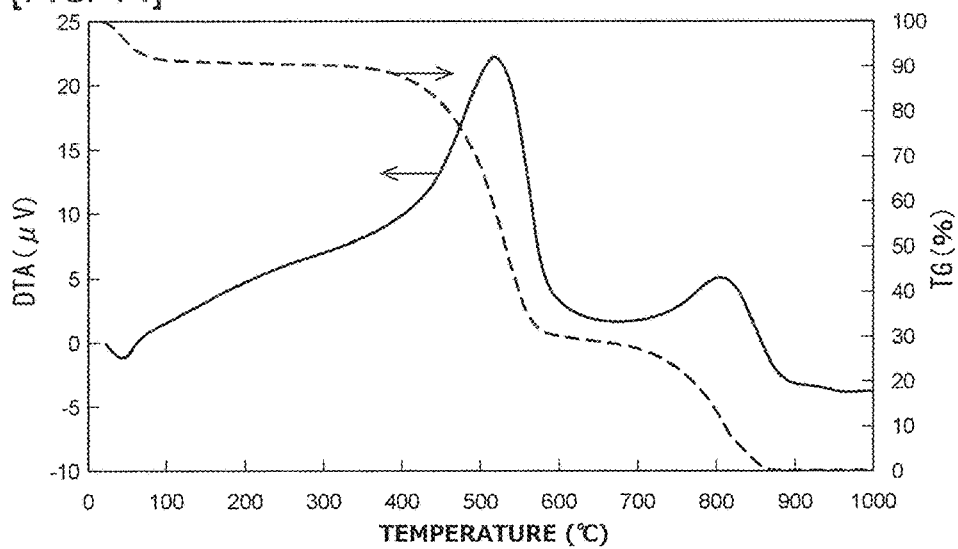
[FIG. 15]
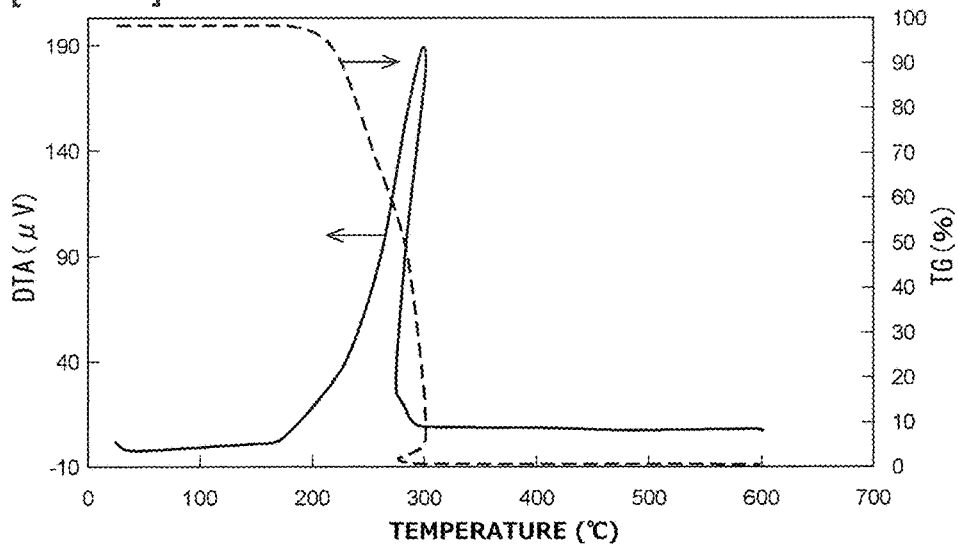

[FIG. 16]
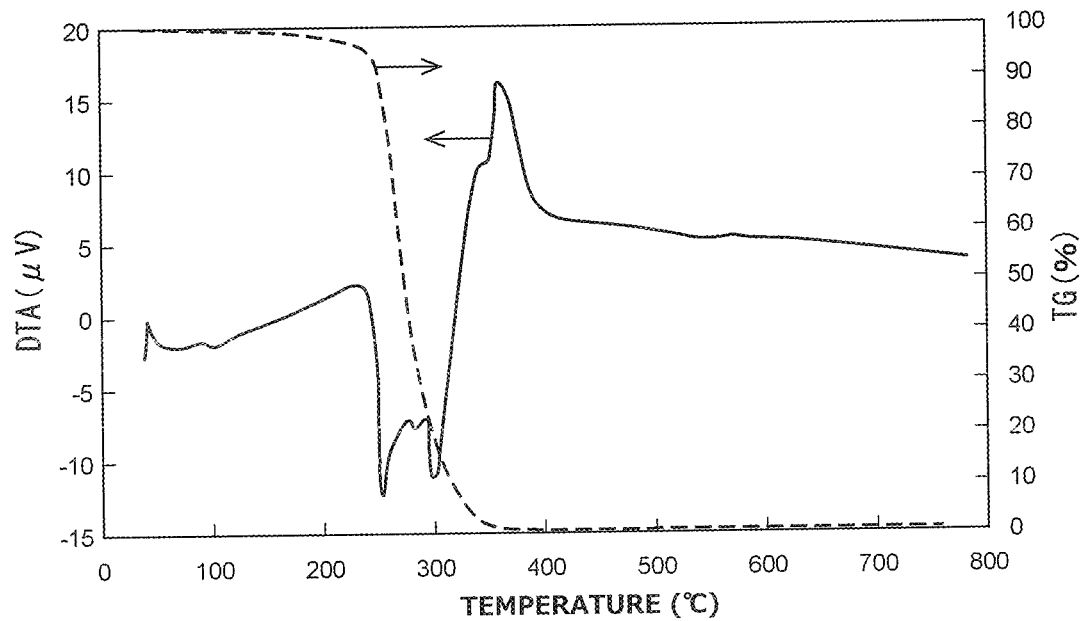
[FIG. 17]
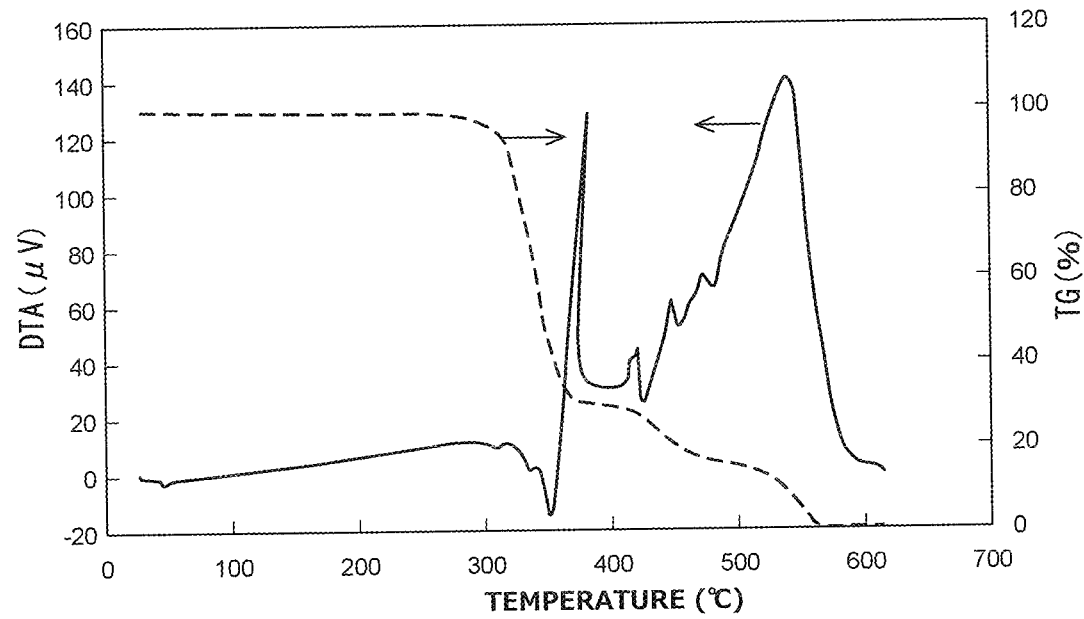

[FIG. 18]
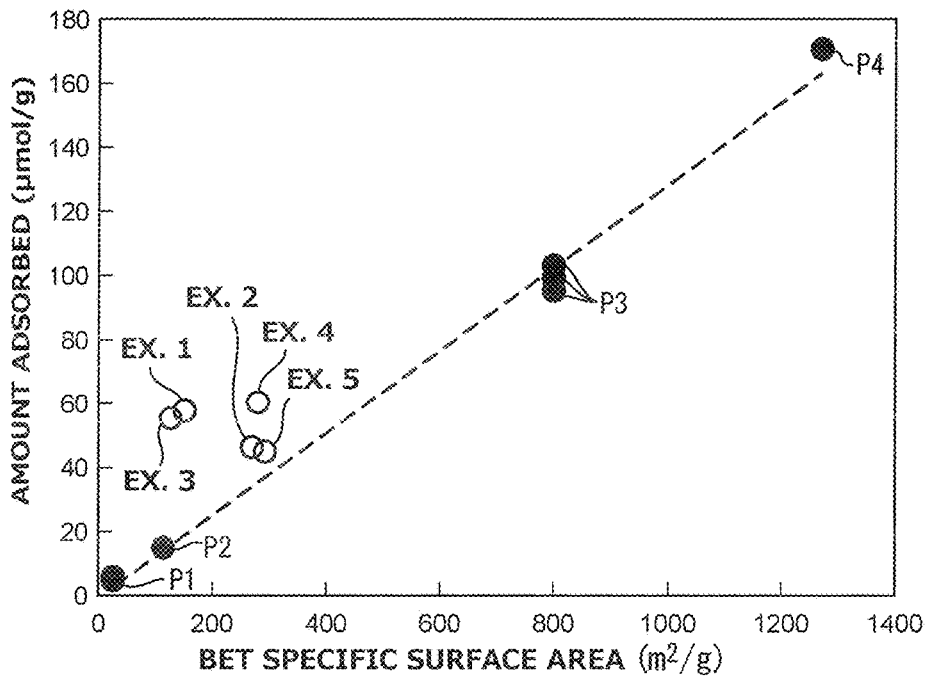
[FIG. 19]
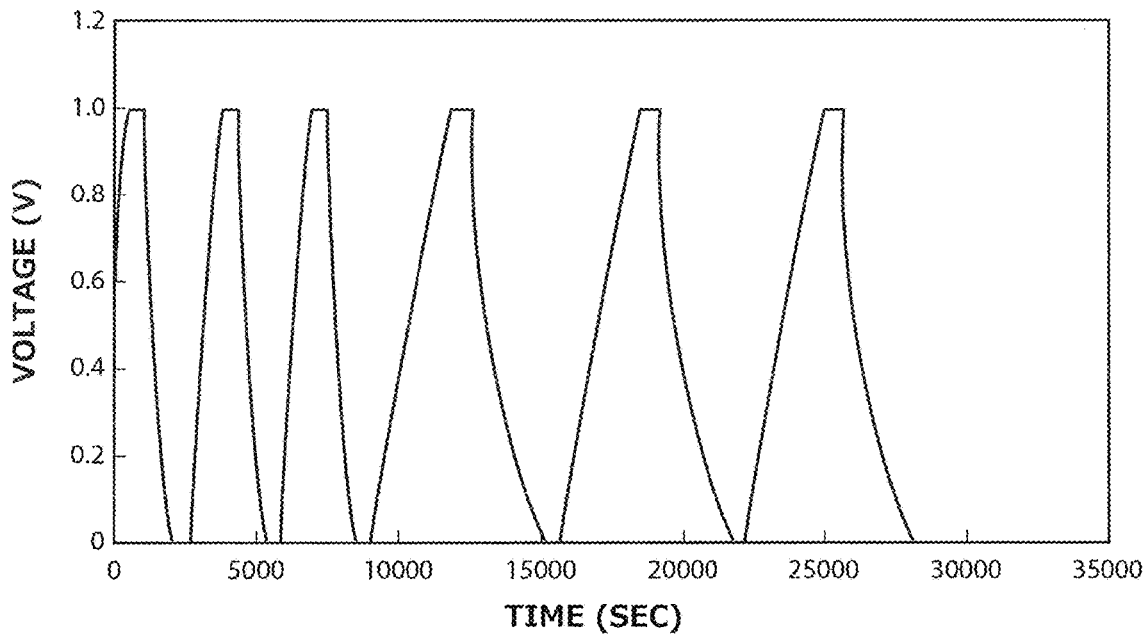

[FIG. 20]
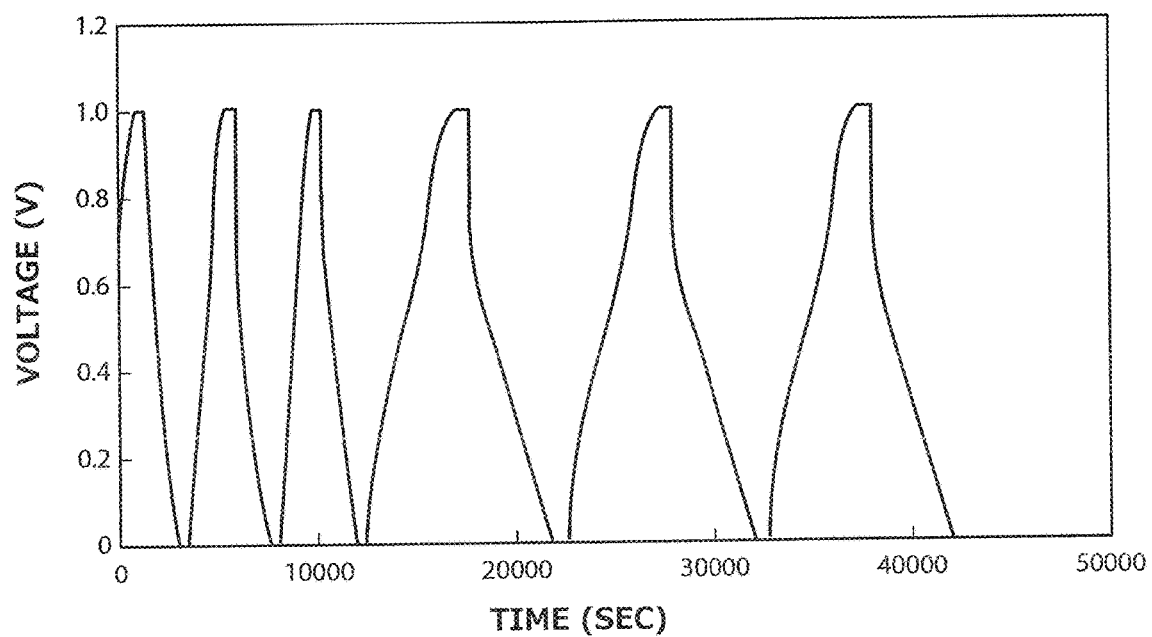

CAPACITOR ELECTRODE MATERIAL, METHOD FOR PRODUCING SAME, AND ELECTRIC DOUBLE LAYER CAPACITOR

TECHNICAL FIELD

The present invention relates to a capacitor electrode material using a carbon material, and a method for producing the same, and more particularly to a capacitor electrode material comprising exfoliated graphite and a binder resin, and a method for producing the same, and an electric double layer capacitor comprising the capacitor electrode material.

BACKGROUND ART

Conventionally, carbon materials such as graphite, activated carbon, carbon nanofibers, or carbon nanotubes are widely used as capacitor electrode materials from an environmental aspect.

For example, the following Patent Literature 1 discloses an electrode of an electrochemical capacitor comprising a doped carbon material and two conductive materials having different particle sizes. In Patent Literature 1, it is described that an electrochemical capacitor having low resistance and high output can be produced by using an electrode obtained by using a doped carbon material as an active material and adding two conductive materials having different particle sizes between the above active materials.

CITATION LIST

Patent Literature

Patent Literature 1: Japanese Patent Laid-Open No. 2013-42134

SUMMARY OF INVENTION

Technical Problem

However, in the electrode of Patent Literature 1, the doped carbon material is used as the active material, and therefore it is necessary to add a conductive aid such as carbon black or acetylene black as a conductive material. Therefore, a problem is that the substantial volume of the active material decreases.

In addition, in the electrochemical capacitor of Patent Literature 1, an increase in capacitance is promoted by using the doped carbon material as the active material for the electrode, which is still insufficient.

It is an object of the present invention to provide a capacitor electrode material that does not require the use of a conductive aid and can increase the capacitance of an electric double layer capacitor, and a method for producing the same, and an electric double layer capacitor formed using the capacitor electrode material.

Solution to Problem

A capacitor electrode material according to the present invention comprises resin-remaining partially exfoliated graphite obtained by pyrolyzing a resin in a composition in which the resin is fixed to graphite or primary exfoliated graphite by grafting or adsorption, the resin-remaining partially exfoliated graphite having a structure in which graphite is partially exfoliated, with part of the resin remaining; and a binder resin.

In a particular aspect of the capacitor electrode material according to the present invention, when an amount of methylene blue adsorbed per g of the resin-remaining partially exfoliated graphite (μmol/g) is y, the amount of methylene blue adsorbed being measured based on a difference between an absorbance of a methanol solution of methylene blue at a concentration of 10 mg/L and an absorbance of a supernatant liquid obtained by introducing the resin-remaining partially exfoliated graphite into the methanol solution of methylene blue followed by centrifugation, and a BET specific surface area ($m^2/g$) of the resin-remaining partially exfoliated graphite is x, a ratio y/x is 0.15 or more, and the BET specific surface area of the resin-remaining partially exfoliated graphite is 40 $m^2/g$ or more.

In another particular aspect of the capacitor electrode material according to the present invention, a pyrolysis initiation temperature and a pyrolysis end temperature of the remaining resin in the resin-remaining partially exfoliated graphite are higher than a pyrolysis initiation temperature and a pyrolysis end temperature of the resin before the pyrolysis, respectively.

In the capacitor electrode material according to the present invention, preferably, the resin is at least one resin selected from a group consisting of polyglycidyl methacrylate, polypropylene glycol, polyvinyl acetate, polybutyral, and polyacrylic acid.

In the capacitor electrode material according to the present invention, preferably, the binder resin is carboxymethyl cellulose, a styrene butadiene rubber, polybutyral, polytetrafluoroethylene, or a fluorine-based polymer. The fluorine-based polymer is preferably polyvinylidene fluoride.

The capacitor electrode material according to the present invention preferably comprises 0.3 to 40 parts by weight of the binder resin based on 100 parts by weight of the resin-remaining partially exfoliated graphite.

A method for producing a capacitor electrode material according to the present invention comprises steps of pyrolyzing a resin in a composition in which the resin is fixed to graphite or primary exfoliated graphite by grafting or adsorption to obtain resin-remaining partially exfoliated graphite which has a structure in which graphite is partially exfoliated and in which part of the resin remains; and incorporating a binder resin in the resin-remaining partially exfoliated graphite followed by forming into an electrode material.

In the method for producing a capacitor electrode material according to the present invention, preferably, the forming of the electrode material is performed by sheeting by a rolling roller followed by drying.

An electric double layer capacitor according to the present invention comprises a capacitor electrode material formed according to the present invention.

Advantageous Effects of Invention

According to the capacitor electrode material and the method for producing the same according to the present invention, resin-remaining partially exfoliated graphite is used as a graphite-based material, and therefore no conductive aid is required. In addition, by using the above capacitor electrode material for an electrode, an electric double layer capacitor having large capacitance can be provided.

BRIEF DESCRIPTION OF DRAWINGS

FIG. 1 is a diagram showing the TG/DTA measurement results of resin-remaining partially exfoliated graphite used in Example 1.

FIG. 2 is a diagram showing the XRD spectra of the resin-remaining partially exfoliated graphite and expanded graphite, raw material graphite, used in Example 1.

FIG. 3 is a photograph of the resin-remaining partially exfoliated graphite used in Example 1 taken at 1000× magnification by a scanning electron microscope (SEM).

FIG. 4 is a photograph of the resin-remaining partially exfoliated graphite used in Example 1 taken at 6000× magnification by the scanning electron microscope (SEM).

FIG. 5 is a diagram showing the TG/DTA measurement results of resin-remaining partially exfoliated graphite used in Example 2.

FIG. 6 is a diagram showing the XRD spectra of the resin-remaining partially exfoliated graphite and expanded graphite, raw material graphite, used in Example 2.

FIG. 7 is a photograph of the resin-remaining partially exfoliated graphite used in Example 2 taken at 3000× magnification by a scanning electron microscope (SEM).

FIG. 8 is a photograph of the resin-remaining partially exfoliated graphite used in Example 2 taken at 6000× magnification by the scanning electron microscope (SEM).

FIG. 9 is a diagram showing the TG/DTA measurement results of resin-remaining partially exfoliated graphite used in Example 3.

FIG. 10 is a diagram showing the XRD spectra of the resin-remaining partially exfoliated graphite and expanded graphite, raw material graphite, used in Example 3.

FIG. 11 is a photograph of the resin-remaining partially exfoliated graphite used in Example 3 taken at 1000× magnification by a scanning electron microscope (SEM).

FIG. 12 is a photograph of the resin-remaining partially exfoliated graphite used in Example 3 taken at 5000× magnification by the scanning electron microscope (SEM).

FIG. 13 is a diagram showing the TG/DTA measurement results of resin-remaining partially exfoliated graphite used in Example 4.

FIG. 14 is a diagram showing the TG/DTA measurement results of resin-remaining partially exfoliated graphite used in Example 5.

FIG. 15 is a diagram showing the TG/DTA measurement results of a resin used in Example 1.

FIG. 16 is a diagram showing the TG/DTA measurement results of a resin used in Example 2.

FIG. 17 is a diagram showing the TG/DTA measurement results of a resin used in Example 3.

FIG. 18 is a diagram showing the relationship between the BET specific surface area and the amount of methylene blue adsorbed for the resin-remaining partially exfoliated graphites used in Examples 1 to 5.

FIG. 19 is a diagram showing the results of the measurement of repeated charge and discharge characteristics between 0 V and 1 V for an electrode obtained in Example 1.

FIG. 20 is a diagram showing the results of the measurement of repeated charge and discharge characteristics between 0 V and 1 V for an electrode obtained in Example 2.

DESCRIPTION OF EMBODIMENTS

The details of the present invention will be described below.

[Capacitor Electrode Material]

A capacitor electrode material according to the present invention comprises resin-remaining partially exfoliated graphite and a binder resin. In the capacitor electrode material according to the present invention, the blending of a conductive aid is not essential. In other words, a conductive aid may or may not be blended because the above resin-remaining partially exfoliated graphite constituting the capacitor electrode material is made under a non-oxidizing atmosphere and has conductivity. Using no conductive aid has the effect of being able to improve capacitance much more with small electrode volume.

The shape of the capacitor electrode material according to the present invention is not particularly limited, and those having appropriate shapes such as a film shape, a sheet shape, and a granular shape can be used. The details of the resin-remaining partially exfoliated graphite and the binder resin that are the essential constituents of the capacitor electrode material of the present invention will be described below.

(Resin-Remaining Partially Exfoliated Graphite)

The resin-remaining partially exfoliated graphite is obtained by providing a composition which comprises graphite or primary exfoliated graphite and a resin and in which the resin is fixed to the graphite or primary exfoliated graphite by grafting or adsorption, and pyrolyzing the resin incorporated in the composition while allowing part of the resin to remain.

In the resin-remaining partially exfoliated graphite, the distance between the graphene layers in the graphite or primary exfoliated graphite is increased by the above pyrolysis, and thus the graphite is partially exfoliated. In the resin-remaining partially exfoliated graphite, the graphite is partially exfoliated from the edge to the inside to some extent.

The resin-remaining partially exfoliated graphite has a large number of portions in which the graphite is exfoliated. The above portion in which the graphite is exfoliated refers to a portion in which some graphene stacks and graphenes in the graphite or primary exfoliated graphite are partially exfoliated.

The resin-remaining partially exfoliated graphite has a structure in which graphenes are stacked as in the original graphite or primary exfoliated graphite in the portion on the central side. However, portions in which the distance between the graphene layers is more increased than in the original graphite or primary exfoliated graphite by the pyrolysis of part of the resin may also be present in the portion on the central side.

In the present invention, since the above pyrolysis is performed while part of the resin is allowed to remain, part of the resin fixed to the graphite or primary exfoliated graphite by grafting or adsorption remains. Therefore, the specific surface area increases more significantly than the specific surface area of the original graphite. In addition, since part of the resin remains, the dispersibility in the binder improves, and the amount of the binder can be reduced. Further, since the resin-remaining partially exfoliated graphite comprises the remaining resin, the resin-remaining partially exfoliated graphite has low scattering properties though having a large specific surface area and is easily handled.

The above graphite is a stack of a plurality of graphenes. As the graphite, natural graphite, synthetic graphite, expanded graphite, and the like can be used. In expanded graphite, the distance between graphene layers is larger than in usual graphite. Therefore, the expanded graphite is easily exfoliated. Therefore, when expanded graphite is used, exfoliated graphite can be much more easily obtained.

In the above graphite, the number of stacked graphenes is about 100000 or more to 1000000, and the above graphite has a value of 35 m²/g or less in specific surface area according to BET (BET specific surface area).

In contrast, in partially exfoliated graphite, the number of stacked graphenes in portions in which the graphite is partially exfoliated is small. The number of stacked graphenes in the above portions in which the graphite is exfoliated is preferably 1000 or less, more preferably 300 or less, and further preferably 100 or less. When the number of stacked graphenes in the exfoliated portions is small, the compatibility with the binder resin can be much more increased.

In the partially exfoliated graphite, the interlayer distance between the graphenes is increased, and the number of stacked graphenes in the exfoliated portions in the edge portion is small, and therefore the specific surface area according to BET (BET specific surface area) is large. The BET specific surface area of the partially exfoliated graphite is preferably 40 m²/g or more, more preferably 60 m²/g or more, and further preferably 100 m²/g or more. The BET specific surface area of the partially exfoliated graphite is preferably 2500 m²/g or less. When the BET specific surface area is in the above range, the compatibility with the binder resin can be much more increased.

In the present invention, primary exfoliated graphite may be used as a raw material instead of graphite. The primary exfoliated graphite includes many exfoliated graphites obtained by exfoliating graphite. When primary exfoliated graphite is used as a raw material, a composition which comprises primary exfoliated graphite and a resin and in which the resin is grafted or adsorbed on the primary exfoliated graphite is provided. The primary exfoliated graphite is obtained by exfoliating graphite, and therefore its specific surface area may be larger than that of graphite.

As used herein, exfoliated graphite is a graphene stack after exfoliation obtained by subjecting the original graphite or primary exfoliated graphite to exfoliation treatment, and refers to a graphene stack having a larger specific surface area than the above original graphite or primary exfoliated graphite, or a graphene stack in which the decomposition end point of the original graphite or primary exfoliated graphite shifts to lower temperature.

The resin fixed to the graphite or primary exfoliated graphite by grafting or adsorption is not particularly limited but is preferably a polymer of a radical polymerizable monomer. The resin may be a copolymer of a plurality of types of radical polymerizable monomers or a homopolymer of one type of radical polymerizable monomer.

Examples of the resin used include polypropylene glycol, polyglycidyl methacrylate, polyvinyl acetate, polybutyral, and polyacrylic acid. Preferred examples include polyglycidyl methacrylate. When polyglycidyl methacrylate is used, the specific surface area of the partially exfoliated graphite can be much more increased.

The amount of the resin remaining in the resin-remaining partially exfoliated graphite is preferably 5 parts by weight to 450 parts by weight based on 100 parts by weight of the partially exfoliated graphite. The amount of the remaining resin is more preferably 15 parts by weight to 350 parts by amount, further preferably 25 parts by weight to 300 parts by weight. By setting the amount of the remaining resin in the above range, the specific surface area of the resin-remaining partially exfoliated graphite can be much more increased.

In the resin-remaining partially exfoliated graphite, when the amount of methylene blue adsorbed (μ mol/g) measured by the following method is y, and the BET specific surface area (m²/g) is x, it is preferred that the ratio y/x is 0.15 or more, and the BET specific surface area is 40 m²/g or more.

The ratio y/x is more preferably 0.17 or more, further preferably 0.20 or more. The BET specific surface area is more preferably 60 m²/g or more, further preferably 100 m²/g or more.

The above amount of methylene blue adsorbed is measured based on the difference between the absorbance of a methanol solution of methylene blue at a concentration of 10 mg/L and the absorbance of a supernatant liquid obtained by introducing the resin-remaining partially exfoliated graphite into the methanol solution of methylene blue followed by stirring and then centrifugation.

More particularly, the above amount of methylene blue adsorbed is obtained by the following method. The resin-remaining partially exfoliated graphite is introduced into a methanol solution of methylene blue at a concentration of 10 mg/L, and the mixture is stirred. Next, the mixture is centrifuged, and a change in the absorbance of the obtained supernatant liquid at the maximum absorption wavelength is observed. The methylene blue is adsorbed by π conjugation on portions in which graphenes are stacked in the resin-remaining partially exfoliated graphite. In contrast, the methylene blue emits fluorescence by irradiation with light. When the methylene blue is adsorbed on the graphene, it does not emit fluorescence. In other words, the fluorescence intensity decreases. Thus, the amount of methylene blue adsorbed can be obtained from the amount of decrease in the fluorescence intensity obtained from the above supernatant liquid with respect to the fluorescence intensity of the original methylene blue.

In contrast, there is a correlation between the above amount of methylene blue adsorbed and the specific surface area of a carbonaceous material. In conventionally known spherical graphite particles, when the specific surface area (m²/g) obtained according to BET is x, and the above amount of methylene blue adsorbed (μ mol/g) is y, the relationship of y≈0.13x holds. This indicates that as the specific surface area increases, the amount of methylene blue adsorbed increases. Therefore, the amount of methylene blue adsorbed can be an indicator replacing the specific surface area.

In the present invention, as described above, the ratio y/x of the resin-remaining partially exfoliated graphite constituting the capacitor electrode material according to the present invention is preferably 0.15 or more. In contrast, in the conventional spherical graphite particles, the ratio y/x is 0.13. Therefore, when the ratio y/x is 0.15 or more, the amount of methylene blue adsorbed increases though the BET specific surface area is the same as that of the conventional spherical graphite. In other words, in this case, in a dry state, condensation occurs to some extent, but in a wet state such as in methanol, the distance between graphenes or between graphites can be much more increased than in the dry state.

The pyrolysis initiation temperature and the pyrolysis end temperature of the resin in the resin-remaining partially exfoliated graphite are preferably higher than the pyrolysis initiation temperature and the pyrolysis end temperature of the resin before compounding, respectively. In the present invention, the pyrolysis initiation temperature and the pyrolysis end temperature refer to TAG measurement-dependent decomposition initiation temperature and decomposition end point temperature, respectively.

The above resin-remaining partially exfoliated graphite is characterized by being relatively less likely to scatter. This is considered to be because the polymer (resin) obtained by the polymerization of the above radical polymerizable monomer is not completely decomposed and remains in the pyrolysis step as described later. In other words, it is considered that the resin positioned in portions sandwiched between the graphene layers in the resin-remaining partially exfoliated graphite is sandwiched between the graphenes on both sides and therefore is not completely decomposed in the vicinity of the pyrolysis temperature. Therefore, the above resin-remaining partially exfoliated graphite is easily handled.

In addition, in the above resin-remaining partially exfoliated graphite, the interlayer distance between the graphenes is increased, and the specific surface area is large. Further, in the above resin-remaining partially exfoliated graphite according to the present invention, the central portion has a graphite structure, and the edge portion is an exfoliated structure. Therefore, the above resin-remaining partially exfoliated graphite is more easily handled than conventional exfoliated graphite.

In addition, the above resin-remaining partially exfoliated graphite according to the present invention comprises a resin and therefore has high dispersibility in other resins. Particularly, when other resins are resins having a high affinity for the resin incorporated in the above resin-remaining partially exfoliated graphite, the dispersibility of the above resin-remaining partially exfoliated graphite in the other resins is much more increased.

(Binder Resin)

As the above binder resin, polybutyral, polytetrafluoroethylene, styrene butadiene rubbers, polyimide resins, or fluorine-based polymers such as polyvinylidene fluoride, water-soluble carboxymethyl cellulose, or the like can be used. Preferably, polytetrafluoroethylene can be used because when polytetrafluoroethylene is used, the dispersibility and the heat resistance improve much more.

The blending ratio of the above binder resin is desirably in the range of 0.3 to 40 parts by weight, more desirably in the range of 0.3 to 15 parts by weight, based on 100 parts by weight of the resin-remaining partially exfoliated graphite. In this range, the volume of the active material can be much more increased.

[Method for Producing Capacitor Electrode Material]

In a method for producing a capacitor electrode material according to the present invention, first, a resin in a composition in which the resin is fixed to graphite or primary exfoliated graphite by grafting or adsorption is pyrolyzed to obtain resin-remaining partially exfoliated graphite which has a structure in which the graphite is partially exfoliated and in which part of the resin remains. Thereafter, a binder resin and a solvent are incorporated in the above resin-remaining partially exfoliated graphite followed by forming into an electrode material to obtain a capacitor electrode material.

The forming of the above electrode material is preferably performed by sheeting by a rolling roller followed by drying. In addition to this, the forming of the above electrode material can also be performed by coating a current collector with a coating liquid comprising the above resin-remaining partially exfoliated graphite, a binder resin, and a solvent followed by drying. As the above solvent, ethanol, N-methylpyrrolidone (NMP), water, and the like can be used.

A method for producing the above resin-remaining partially exfoliated graphite will be described in detail below.

(Method for Producing Resin-Remaining Partially Exfoliated Graphite)

In the method for producing the above resin-remaining partially exfoliated graphite, first, a composition in which a resin is fixed to graphite or primary exfoliated graphite is provided. The fixation of the resin to the graphite or exfoliated graphite is performed by grafting or adsorption.

Examples of the method of the above grafting include a method of providing a mixture comprising the above graphite or primary exfoliated graphite and a radical polymerizable monomer, and polymerizing the radical polymerizable monomer in the mixture to produce a polymer in which the above radical polymerizable monomer is polymerized in the mixture and graft the polymer, that is, a resin, on the graphite or primary exfoliated graphite.

Examples of the above radical polymerizable monomer include propylene glycol, glycidyl methacrylate, vinyl acetate, butyral, or acrylic acid.

Alternatively, a previously obtained polymer may be heated to a particular temperature range in the presence of graphite or primary exfoliated graphite to directly graft on the graphite or primary exfoliated graphite a polymer radical produced by pyrolyzing the polymer.

As the method of the above adsorption, a method of dissolving or dispersing graphite or primary exfoliated graphite and a resin in an appropriate solvent and then mixing the graphite or primary exfoliated graphite with the resin in the solvent can be used. Preferably, in order to more effectively adsorb the resin on the graphite or primary exfoliated graphite, ultrasonic treatment is desirably carried out.

Examples of the above polymer, that is, a resin, include polypropylene glycol, polyglycidyl methacrylate, polyvinyl acetate, polybutyral, or polyacrylic acid.

Next, the resin in the composition in which the resin is fixed to the graphite or primary exfoliated graphite by the above grafting or adsorption is pyrolyzed. Thus, the graphite or primary exfoliated graphite is exfoliated while part of the resin is allowed to remain, and the resin-remaining partially exfoliated graphite can be obtained. In order to perform the pyrolysis of the resin in this case, the above composition may be heated to the pyrolysis temperature of the resin or higher.

More specifically, the above composition is heated to the pyrolysis temperature of the resin or higher, and the resin is further fired. At this time, the resin is fired to the extent that the resin remains in the composition. Pyrolysis such that the resin is allowed to remain can be achieved by adjusting the heating time. In other words, by shortening the heating time, the amount of the remaining resin can be increased. By lowering the heating temperature, the amount of the remaining resin can also be increased. In this manner, the resin-remaining partially exfoliated graphite can be obtained. For the pyrolysis temperature, for example, the pyrolysis temperature of polyglycidyl methacrylate is about 400° C. to 500° C. The step of the above grafting, and the pyrolysis of the above polymer may be continuously carried out in the same heating step.

It is considered that the resin-remaining partially exfoliated graphite can be obtained by the pyrolysis of the above polymer for the following reason. When the polymer (resin) grafted or adsorbed on the graphite or primary exfoliated graphite is fired, large stress acts on the grafting point or adsorption point, and thus the distance between graphene layers is increased. Thus, the graphite is partially exfoliated, and the large number of portions in which the graphite is exfoliated described above are formed.

In the step of providing the above composition, preferably, a composition further comprising a pyrolyzable foaming agent that generates a gas in pyrolysis is provided. In this case, the graphite or primary exfoliated graphite can be much more effectively exfoliated by heating.

The above pyrolyzable foaming agent is not particularly limited as long as it is a compound that decomposes spontaneously by heating and generates a gas during the decomposition. As the above pyrolyzable foaming agent, for example, foaming agents such as azocarboxylic acid-based, diazoacetamide-based, azonitrile compound-based, benzenesulfohydrazine-based, or nitroso compound-based foaming agents that generate a nitrogen gas during decomposition, or foaming agents that generate carbon monoxide, carbon dioxide, methane, aldehyde, or the like during decomposition can be used. The above pyrolyzable foaming agent may be used alone, or a plurality of types of foaming agents may be used in combination.

Preferably, as the above pyrolyzable foaming agent, azodicarbonamide (ADCA) having a structure represented by the following formula (1) and foaming agents having structures represented by the following formulas (2) to (4) can be used. These foaming agents decompose spontaneously by heating and generate a nitrogen gas during the decomposition.

[Formula 1]

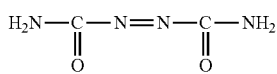

Formula (1)

[Formula 2]

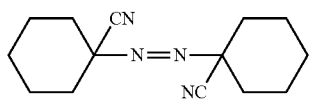

Formula (2)

[Formula 3]

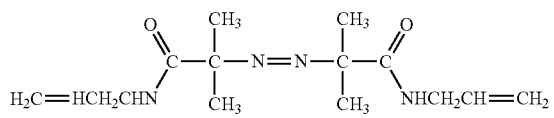

Formula (3)

[Formula 4]

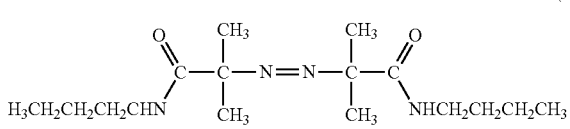

Formula (4)

The pyrolysis temperature of the above pyrolyzable foaming agent is not particularly limited and may be lower or higher than a temperature at which the above radical polymerizable monomer spontaneously initiates polymerization. The pyrolysis temperature of the ADCA having the structure represented by the above formula (1) is 210° C., and the pyrolysis initiation temperatures of the foaming agents having the structures represented by the above formulas (2) to (4) are 88° C., 96° C., and 110° C. in order.

The blending ratio between the above graphite or primary exfoliated graphite and the above pyrolyzable foaming agent is not particularly limited, but 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, the above graphite or primary exfoliated graphite can be much more effectively exfoliated to effectively obtain the resin-remaining partially exfoliated graphite.

[Electric Double Layer Capacitor]

An electric double layer capacitor according to the present invention comprises a capacitor electrode material formed according to the present invention. Therefore, no conductive aid is required, and therefore the electric double layer capacitor of the present invention has large capacitance.

There are two types of electrolytic solutions for electric double layer capacitors, aqueous and nonaqueous (organic) electrolytic solutions. The resin-remaining partially exfoliated graphite of the present invention can be used for both electrolytic solutions.

As the aqueous electrolytic solution, for example, water is used for the solvent, and sulfuric acid, potassium hydroxide, or the like is used for the electrolyte.

As the nonaqueous electrolytic solution, for example, propylene carbonate (PC), ethylene carbonate (EC), dimethyl carbonate (DMC), diethyl carbonate (DEC), or the like is used for the solvent, and lithium hexafluorophosphate ($LiPF_6$), lithium tetrafluoroborate ($LiBF_4$), tetraethylammonium tetrafluoroborate ($TEABF_4$), triethylmethylammonium tetrafluoroborate ($TEMABF_4$), or the like is used for the electrolyte.

When the resin-remaining partially exfoliated graphite of the present invention is used for the nonaqueous electrolytic solution, the ratio y/x when the amount of methylene blue adsorbed (t mol/g) described above is y and the BET specific surface area ($m^2/g$) is x is preferably 0.25 or more, more preferably 0.35 or more.

As the ratio y/x increases, a state in which the resin-remaining partially exfoliated graphite is expanded in the nonaqueous electrolytic solution is easily reached, that is, the specific surface area increases much more in the nonaqueous electrolytic solution, and high performance equal to or more than expected from the BET specific surface area can be exhibited.

In contrast, when the resin-remaining partially exfoliated graphite of the present invention is used for the aqueous electrolytic solution, the ratio y/x is preferably less than 0.25, more preferably less than 0.2.

As the ratio y/x decreases, a state in which the resin-remaining partially exfoliated graphite is expanded in the aqueous electrolytic solution is easily reached, that is, the specific surface area increases much more in the aqueous electrolytic solution, and high performance equal to or more than expected from the BET specific surface area can be exhibited.

Next, the present invention will be clarified by giving specific Examples and Comparative Examples of the present invention. The present invention is not limited to the following Examples.

Example 1

Preparation of Resin-Remaining Partially Exfoliated Graphite 20 g of expanded graphite (manufactured by TOYO TANSO CO., LTD., trade name "PF Powder 8," BET surface area=22 $m^2/g$), 40 g of ADCA having the structure represented by formula (1) (manufactured by EIWA CHEMICAL IND. CO., LTD, trade name "AC # R-K3," pyrolysis temperature 210° C.) as a pyrolyzable foaming agent, 400 g of polypropylene glycol (manufactured by Sanyo Chemical Industries, Ltd., product number: SANNIX GP-3000, number average molecular weight=3000), and 400 g of tetrahydrofuran as a solvent were mixed to provide a raw material composition. The raw material composition was irradiated with ultrasonic waves at 100 W and oscillation frequency: 28 kHz for 5 hours using an ultrasonic treatment apparatus (manufactured by Honda Electronics Co., Ltd.). The polypropylene glycol (PPG) was adsorbed on the expanded graphite by the ultrasonic treatment. In this manner, a composition in which the polypropylene glycol was adsorbed on the expanded graphite was provided.

After the above ultrasonic irradiation, the above composition was molded by a solution casting method, maintained at a drying temperature of 80° C. for 2 hours, and then maintained at a temperature of 110° C. for 1 hour. Thereafter, the above composition was maintained at a temperature of 150° C. for 1 hour and further maintained at a temperature of 230° C. for 2 hours. Thus, the above ADCA was pyrolyzed in the above composition for foaming.

Next, the heating step of maintaining the above composition at a temperature of 430° C. for 1.5 hours was carried out. Thus, the above polypropylene glycol was pyrolyzed to obtain resin-remaining partially exfoliated graphite. In this resin-remaining partially exfoliated graphite, part of the polypropylene glycol remains.

A burning test was performed in which the obtained resin-remaining partially exfoliated graphite was heated to 30° C. to 1000° C. at a rate of 10° C./min under an air atmosphere. The TG/DTA measurement results when this burning test was performed are shown in FIG. 1.

An inflection point appears in the TG curve shown by the solid line in FIG. 1 in the vicinity of 520° C. shown by the arrow A in FIG. 1. It is considered that the polypropylene glycol also remains at temperatures higher than this inflection point.

The XRD spectrum of the above resin-remaining partially exfoliated graphite obtained is shown by a broken line, and for comparison, the XRD spectrum of the expanded graphite PF Powder that is raw material graphite is shown by a solid line in FIG. 2. From FIG. 2, it was confirmed that part of the resin-remaining partially exfoliated graphite was exfoliated between the graphite layers when the polypropylene glycol was pyrolyzed.

FIG. 3 and FIG. 4 are scanning electron micrographs at 1000× and 6000× magnifications of the resin-remaining partially exfoliated graphite obtained as described above. As is clear from FIG. 3 and FIG. 4, it is seen that the graphite layers are partially spaced. The specific surface area of the obtained resin-remaining partially exfoliated graphite according to BET was 150 m$^2$/g.

900 mg of the resin-remaining partially exfoliated graphite obtained as described above, 100 mg of polytetrafluoroethylene, and 5 g of ethanol as a solvent were kneaded with a mortar. Then, the kneaded material was sheeted into a sheet with film thickness: 150 μm by a rolling roller and thereafter vacuum-dried at 60° C. for 1 hour. The obtained sample was cut to 1 cm$^2$ and vacuum-dried at 120° C. for 12 hours to obtain electrode sheet.

Example 2

10 g of polyglycidyl methacrylate (manufactured by NOF CORPORATION, product number: G2050M, weight average molecular weight=250000, pyrolysis temperature=350° C.) was dissolved in tetrahydrofuran to obtain a 10% by weight solution of polyglycidyl methacrylate. 1000 mg of expanded graphite (manufactured by TOYO TANSO CO., LTD., trade name "PF Powder 8") was added to this polyglycidyl methacrylate solution to form a mixture.

Next, the above mixture was irradiated with ultrasonic waves at 100 W and an oscillation frequency of 28 kHz for 120 minutes using an ultrasonic treatment apparatus (manufactured by Honda Electronics Co., Ltd.). Thus, a composition in which the above expanded graphite was dispersed in the polyglycidyl methacrylate was obtained. This composition was sheet-molded to a thickness of 100 to 1000 m by a casting method. The obtained sheet was heated and dried at a temperature of 110° C. for 2 hours.

Next, the heating step of maintaining the sheet at a temperature of 430° C. for 0.5 hours was carried out. Thus, the above polyglycidyl methacrylate was pyrolyzed to obtain resin-remaining partially exfoliated graphite. In this resin-remaining partially exfoliated graphite, part of the polyglycidyl methacrylate remains.

A burning test was performed in which the obtained resin-remaining partially exfoliated graphite was heated to 30° C. to 1000° C. at a rate of 10° C./min under an air atmosphere. The TG/DTA measurement results when this burning test was performed are shown in FIG. 5.

From FIG. 5, it was confirmed that the peak derived from the graphite and the peak of the polyglycidyl methacrylate as the remaining resin were present.

The XRD spectrum of the above resin-remaining partially exfoliated graphite obtained is shown by a broken line, and for comparison, the XRD spectrum of the expanded graphite PF Powder that is raw material graphite is shown by a solid line in FIG. 6. From FIG. 6, it was confirmed that part of the resin-remaining partially exfoliated graphite was exfoliated between the graphite layers when the polyglycidyl methacrylate was pyrolyzed.

FIG. 7 and FIG. 8 are scanning electron micrographs at 3000× and 6000× magnifications of the resin-remaining partially exfoliated graphite obtained as described above. As is clear from FIG. 7 and FIG. 8, it is seen that the graphite layers are partially spaced. The specific surface area of the obtained resin-remaining partially exfoliated graphite according to BET was 270 m$^2$/g.

An electrode sheet was obtained as in Example 1 using the resin-remaining partially exfoliated graphite obtained as described above.

Example 3

160 g of polyvinyl acetate (manufactured by DENKI KAGAKU KOGYO KABUSHIKI KAISHA, product number: SAKNOHOL SN-04T, degree of polymerization 500-700) was dissolved in tetrahydrofuran to obtain a 33.3% by weight solution of polyvinyl acetate. 8 g of expanded graphite (manufactured by TOYO TANSO CO., LTD., trade name "PF Powder 8") and 16 g of ADCA (manufactured by EIWA CHEMICAL IND. CO., LTD, trade name "AC # R-K3," pyrolysis temperature 210° C.) were added to this polyvinyl acetate solution to form a mixture.

Next, the above mixture was irradiated with ultrasonic waves at 100 W and an oscillation frequency of 28 kHz for 5 hours using an ultrasonic treatment apparatus (manufactured by Honda Electronics Co., Ltd.). Thus, a composition in which the above expanded graphite was dispersed in the polyvinyl acetate was obtained. This composition was sheet-molded to a thickness of 100 to 1000 μm by a casting method, maintained at a drying temperature of 80° C. for 2 hours, and then maintained at a temperature of 110° C. for 1 hour. Thereafter, the composition was maintained at a temperature of 150° C. for 1 hour for drying the tetrahydrofuran to obtain a sheet-shaped composition. Further, the sheet-shaped composition was coarsely ground by a grinder, and a powdery composition in which the polyvinyl acetate was adsorbed on the expanded graphite was obtained. This powdery composition was divided into four equal parts in petri dishes and further maintained at a temperature of 230° C. for 2 hours. Thus, the above ADCA was pyrolyzed in the above composition for foaming.

Next, the heating step of maintaining the above composition at a temperature of 450° C. for 2 hours was carried out. More particularly, the above composition was heated at a rate of 5° C./min, and held for 2 hours after 450° C. was reached. Thus, the above polyvinyl acetate was pyrolyzed to obtain resin-remaining partially exfoliated graphite. In this resin-remaining partially exfoliated graphite, part of the polyvinyl acetate remains.

A burning test was performed in which the obtained resin-remaining partially exfoliated graphite was heated to 30° C. to 1000° C. at a rate of 10° C./min under an air atmosphere. The TG/DTA measurement results when this burning test was performed are shown in FIG. 9.

From FIG. 9, it was confirmed that the peak derived from the graphite and the peak of the polyvinyl acetate as the remaining resin were present.

The XRD spectrum of the above resin-remaining partially exfoliated graphite obtained is shown by a broken line, and for comparison, the XRD spectrum of the expanded graphite PF Powder that is raw material graphite is shown by a solid line in FIG. 10. From FIG. 10, it was confirmed that part of the resin-remaining partially exfoliated graphite was exfoliated between the graphite layers when the polyvinyl acetate was pyrolyzed.

FIG. 11 and FIG. 12 are scanning electron micrographs at 3000× and 6000× magnifications of the resin-remaining partially exfoliated graphite obtained as described above. As is clear from FIG. 11 and FIG. 12, it is seen that the graphite layers are partially spaced. The specific surface area of the obtained resin-remaining partially exfoliated graphite according to BET was 127 $m^2/g$.

An electrode sheet was obtained as in Example 1 using the resin-remaining partially exfoliated graphite obtained as described above.

Example 4

50 g of polyglycidyl methacrylate (manufactured by NOF CORPORATION, product number: G2050M, weight average molecular weight=250000, pyrolysis temperature=350° C.) was dissolved in tetrahydrofuran to obtain a 10% by weight solution of polyglycidyl methacrylate. 2.5 g of expanded graphite (manufactured by TOYO TANSO CO., LTD., trade name "PF Powder 8") and 5 g of ADCA (manufactured by EIWA CHEMICAL IND. CO., LTD, trade name "AC # R-K3," pyrolysis temperature 210° C.) were added to this polyglycidyl methacrylate solution to form a mixture.

Next, the above mixture was irradiated with ultrasonic waves at 100 W and an oscillation frequency of 28 kHz for 5 hours using an ultrasonic treatment apparatus (manufactured by Honda Electronics Co., Ltd.). Thus, a composition in which the above expanded graphite was dispersed in the polyglycidyl methacrylate was obtained. This composition was sheet-molded to a thickness of 100 to 1000 μm by a casting method, maintained at a drying temperature of 80° C. for 2 hours, and then maintained at a temperature of 110° C. for 1 hour. Thereafter, the composition was maintained at a temperature of 150° C. for 1 hour for drying the tetrahydrofuran to obtain a sheet-shaped composition. Further, the sheet-shaped composition was coarsely ground by a grinder, and a powdery composition in which the polyglycidyl methacrylate was adsorbed on the expanded graphite was obtained. This powdery composition was divided into two equal parts in petri dishes and further maintained at a temperature of 230° C. for 2 hours. Thus, the above ADCA was pyrolyzed in the above composition for foaming.

Next, the heating step of maintaining the above composition at a temperature of 470° C. for 0.5 hours was carried out. Thus, the above polyglycidyl methacrylate was pyrolyzed to obtain resin-remaining exfoliated graphite. In this resin-remaining exfoliated graphite, part of the polyglycidyl methacrylate remains.

A burning test was performed in which the obtained resin-remaining partially exfoliated graphite was heated to 30° C. to 1000° C. at a rate of 10° C./min under an air atmosphere. The TG/DTA measurement results when this burning test was performed are shown in FIG. 13.

From FIG. 13, it was confirmed that the peak derived from the graphite and the peak of the polyglycidyl methacrylate as the remaining resin were present.

An electrode sheet was obtained as in Example 1 using the resin-remaining partially exfoliated graphite obtained as described above.

Example 5

Resin-remaining partially exfoliated graphite was obtained by performing the same treatment as Example 2 except that 2.5 g of heat-expandable graphite (manufactured by SUZUHIRO CHEMICAL CO., LTD., GREP-EG) was used instead of 2.5 g of expanded graphite (manufactured by TOYO TANSO CO., LTD., trade name "PF Powder 8"). In this resin-remaining exfoliated graphite, part of the polyglycidyl methacrylate remains.

A burning test was performed in which the obtained resin-remaining partially exfoliated graphite was heated to 30° C. to 1000° C. at a rate of 10° C./min under an air atmosphere. The TG/DTA measurement results when this burning test was performed are shown in FIG. 14.

From FIG. 14, it was confirmed that the peak derived from the graphite and the peak of the polyglycidyl methacrylate as the remaining resin were present.

An electrode sheet was obtained as in Example 1 using the resin-remaining partially exfoliated graphite obtained as described above.

Example 6

A coating liquid was made using 900 mg of the resin-remaining partially exfoliated graphite made in Example 1, 100 mg of polyvinylpyrrolidone, and 5 g of NMP. Copper foil was coated with the made coating liquid using an applicator, then dried at 70° C. for 2 hours, and then dried in a vacuum state at 110° C. for 15 hours to obtain an electrode sheet.

Comparative Example 1

An electrode sheet was obtained as in Example 1 except that expanded graphite (manufactured by TOYO TANSO CO., LTD., trade name "PF Powder 8") was used instead of the resin-remaining partially exfoliated graphite.

Comparative Example 2

An electrode sheet was obtained as in Example 5 except that heat-expandable graphite (manufactured by SUZUHIRO CHEMICAL CO., LTD., GREP-EG) was used instead of the resin-remaining partially exfoliated graphite.

Comparative Example 3

An electrode sheet was obtained as in Example 6 except that 900 mg of expanded graphite (manufactured by TOYO TANSO CO., LTD., trade name "PF Powder 8") and 100 mg of ketjen black (manufactured by Lion Corporation, trade name "EC-600JD") were used instead of 900 mg of the resin-remaining partially exfoliated graphite.

(Measurement of Pyrolysis Initiation Temperature and Pyrolysis End Temperature)

A burning test was performed in which each of the polypropylene glycol (manufactured by Sanyo Chemical Industries, Ltd., product number: SANNIX GP-3000, number average molecular weight=3000), the polyglycidyl methacrylate (manufactured by NOF CORPORATION, product number: G2050M, weight average molecular weight=250000, pyrolysis temperature=350° C.), and the polyvinyl acetate (manufactured by DENKI KAGAKU KOGYO KABUSHIKI KAISHA, product number: SAKNOHOL SN-04T, degree of polymerization 500-700) used in the Examples was heated to 30° C. to 1000° C. at a rate of 10° C./min under an air atmosphere. The TG/DTA measurement results when this burning test was performed are shown in FIGS. 15 to 17. FIG. 15 shows the results of the polypropylene glycol used in Example 1, FIG. 16 shows the results of the polyglycidyl methacrylate used in Example 2, and FIG. 17 shows the results of the polyvinyl acetate used in Example 3.

Table 2 shows the pyrolysis initiation temperature and the pyrolysis end temperature of the resins in the resin-remaining partially exfoliated graphites and the raw material resins in Examples 1 to 5 obtained from the TG/DTA measurement results shown in FIG. 1, FIG. 5, FIG. 9, and FIG. 13 to FIG. 17.

TABLE 1

|  | BET specific surface area ($m^2/g$) | Amount of methylene blue adsorbed (μmol/g) | Ratio y/x |
| --- | --- | --- | --- |
| Example 1 | 150 | 57.76 | 0.385 |
| Example 2 | 270 | 46.44 | 0.172 |
| Example 3 | 127 | 55.36 | 0.436 |
| Example 4 | 279 | 60.50 | 0.217 |
| Example 5 | 292 | 45.05 | 0.154 |

(Measurement of BET Specific Surface Area)

For the resin-remaining partially exfoliated graphites obtained by Examples 1 to 5, the BET specific surface area was measured by a specific surface area measuring apparatus ASAP-2000 manufactured by SHIMADZU CORPORATION using a nitrogen gas. The results are shown in the Table 1 described above.

TABLE 2

|  | Pyrolysis initiation temperature (° C.) | Pyrolysis end temperature (° C.) |
| --- | --- | --- |
| Example 1 | 305.9 | 617.4 |
| Example 2 | 313.6 | 600.6 |
| Example 3 | 362.2 | 645.5 |
| Example 4 | 301.8 | 622.5 |
| Example 5 | 302.3 | 643.1 |
| Polypropylene glycol | 170.0 | 300.0 |
| Polyglycidyl methacrylate | 222.6 | 389.5 |
| Polyvinyl acetate | 217.8 | 563.6 |

(Measurement of Amount of Methylene Blue Adsorbed)

For the resin-remaining partially exfoliated graphites obtained by Examples 1 to 5, the amount of methylene blue adsorbed was measured by the following procedure.

Methanol solutions of methylene blue at concentrations of 10 mg/L, 5.0 mg/L, 2.5 mg/L, and 1.25 mg/L were prepared in volumetric flasks. As the methylene blue, methylene blue that was a special grade reagent manufactured by KANTO CHEMICAL CO., INC. was used. Using an ultraviolet-visible spectrophotometer (product number UV-1600) manufactured by SHIMADZU CORPORATION, the absorbance of the above four types of methylene blue solutions prepared was measured, and a calibration curve was prepared.

Next, 0.005 g of the methylene blue was placed in a 50 mL volumetric flask, and methanol was added as a measurement solvent to prepare a 100 mg/L methylene blue solution. This methylene blue solution was diluted 10 times using the measurement solvent to obtain a 10 mg/L methylene blue solution.

A stirrer bar, resin-remaining partially exfoliated graphite to be measured (0.005 to 0.05 g, changed according to the BET value of the sample), and 50 mL of the above 10 mg/L methylene blue solution were added to a 100 mL eggplant flask and then ultrasonically treated for 15 minutes using an ultrasonic cleaning machine. After the resin-remaining partially exfoliated graphite was dispersed in this manner, the dispersion was stirred in a cooling bath at a temperature of 25° C. for 60 minutes.

After adsorption equilibrium was reached, the resin-remaining partially exfoliated graphite and the supernatant liquid were separated by centrifugation. The absorbance of the 10 mg/L methylene blue solution that was blank and the absorbance of the above supernatant liquid were measured using the above ultraviolet-visible spectrophotometer.

The difference between the absorbance of the above blank methylene blue solution and the absorbance of the above supernatant liquid, that is, the amount of decrease in absorbance, was calculated. From this amount of decrease in absorbance and the slope of the above-described calibration curve, the amount of decrease in the concentration of the methylene blue solution was obtained. From this amount of decrease in the concentration of the methylene blue solution, the amount of methylene blue adsorbed on the resin-remaining partially exfoliated graphite surface was obtained by the following formula. The results are shown in the Table 1 described above.

the amount adsorbed(mol/g)={the amount of decrease in the concentration of the methylene blue solution (g/L)×the volume of the measurement solvent (L)}/{the molecular weight of the methylene blue (g/mol)×the mass of the charged carbon sample (g)}

The relationship between the above BET specific surface area and the amount of methylene blue adsorbed is shown in FIG. 18.

In FIG. 18, apart from the resin-remaining partially exfoliated graphites obtained in Examples 1 to 5 described above, the relationship between the BET specific surface area and the amount of methylene blue adsorbed measured as described above for known carbonaceous materials is shown together.

In FIG. 18, the points P1 show the results of spherical graphite (manufactured by the Association of Powder Process Industry and Engineering, JAPAN, product number: RPSA-2) with n=3. The point P2 shows the result of spherical graphite (manufactured by the Association of Powder Process Industry and Engineering, JAPAN, product number: RPSA-3). The points P3 show the results of spherical graphite (Lion Corporation, product number: EC-300J, average particle diameter 40 nm) with n=3. The point P4 shows the result of spherical graphite (Lion Corporation, product number: EC-600JD, average particle diameter 34 nm). It was confirmed that the relationship between the BET specific surface area (x) and the amount of methylene blue absorbed (y) obtained from these four types of known carbonaceous materials (eight points in total) was y=0.13x ($r^2$=0.99).

(Evaluation of Capacitors Using 40% by Weight Sulfuric Acid Aqueous Solution)

A cell was assembled using each of the electrode sheets obtained in Example 1 to Example 5 and Comparative Examples 1 and 2 as a working electrode, together with a counter electrode comprising Pt and a reference electrode comprising Ag/AgCl (sat. KCl), and then the cell was vacuum-impregnated with a sulfuric acid aqueous solution at a concentration of 40% by weight, an electrolytic solution, to make an electric double layer capacitor. Thereafter, the capacitance was evaluated while nitrogen bubbling was performed.

The capacitance for Examples 1 and 2 was calculated from the results of the measurement of repeated charge and discharge characteristics between 0 V and 1 V (calculation range: 0.8-0.4 V or 0.8-0.2 V, current value 100 mA/g or current value 40 mA/g) shown in FIG. 19 and FIG. 20 using the following formula.

$$F=I/(\Delta V/\Delta t)$$

The capacitance for Examples 3 to 5 and Comparative Examples 1 and 2 was calculated by the same method as Example 1 and Example 2.

The measured value capacitance obtained by calculation and the capacitance converted in terms of graphite (excluding the weight of the binder, the aid, and the remaining resin from that of the electrode sheet) for the Examples and the Comparative Examples are shown in the following Table 3.

(Evaluation of Capacitors Using Tetraethylammonium Tetrafluoroborate PC Solution)

A two-electrode flat cell manufactured by TAKUMI GIKEN CO. was assembled in a glove box using each of the electrode sheets obtained in Examples 1 to 3, 5, and 6 and Comparative Examples 1 to 3 for a working electrode and a counter electrode and using a 1 mol tetraethylammonium tetrafluoroborate PC solution for an electrolytic solution, and the capacitance was evaluated.

The capacitance was calculated by the same method as the evaluation of the capacitors using the sulfuric acid aqueous solution described above, from the results of the measurement of repeated charge and discharge characteristics between 0 V and 2 V (calculation range: 1.6-0.8 V or 1.6-0.4 V, current value 100 mA/g or current value 40 mA/g), using the following formula.

$$F=I/(\Delta V/\Delta t)$$

The measured value capacitance obtained by calculation and the capacitance converted in terms of graphite (excluding the weight of the binder, the aid, and the remaining resin from that of the electrode sheet) for the Examples and the Comparative Examples are shown in the following Table 4.

TABLE 3

| | | Capacitance (F/g) | | | |
| | | Measured values | | Converted in terms of graphite | |
| | Current | (0.8-0.4 V) | (0.8-0.2 V) | (0.8-0.4 V) | (0.8-0.2 V) |
| --- | --- | --- | --- | --- | --- |
| Ex. 1 | 100 mA/g | 77.0 | 98.1 | 114.0 | 145.0 |
| | 40 mA/g | 86.5 | 108.0 | 128.0 | 160.0 |
| Ex. 2 | 100 mA/g | 132.0 | 165.0 | 367.0 | 458.0 |
| | 40 mA/g | 152.0 | 185.0 | 422.0 | 514.0 |
| Ex. 3 | 100 mA/g | 66.3 | 87.6 | 226.8 | 299.6 |
| | 40 mA/g | 84.1 | 107.6 | 287.6 | 367.8 |
| Ex. 4 | 100 mA/g | 122.5 | 144.5 | 245.6 | 289.7 |
| | 40 mA/g | 135.1 | 158.4 | 270.9 | 317.6 |
| Ex. 5 | 100 mA/g | 84.8 | 127.6 | 247.9 | 373.0 |
| | 40 mA/g | 100.9 | 141.2 | 295.0 | 412.9 |
| Comp. Ex. 1 | 100 mA/g | 2.6 | 2.7 | 2.8 | 3.0 |
| | 40 mA/g | 2.7 | 2.9 | 3.0 | 3.2 |
| Comp. Ex. 2 | 100 mA/g | 0.7 | 0.8 | 0.9 | 1.0 |
| | 40 mA/g | 0.7 | 0.9 | 0.9 | 1.2 |

TABLE 4

| | | Capacitance (F/g) | | | |
| | | Measured values | | Converted in terms of graphite | |
| | Current | (1.6-0.8 V) | (1.6-0.4 V) | (1.6-0.8 V) | (1.6-0.4 V) |
| --- | --- | --- | --- | --- | --- |
| Ex. 1 | 100 mA/g | 3.22 | 3.29 | 4.74 | 4.84 |
| | 40 mA/g | 3.33 | 3.44 | 4.90 | 5.06 |
| Ex. 2 | 100 mA/g | 1.85 | 1.94 | 5.99 | 6.30 |
| | 40 mA/g | 2.04 | 2.15 | 6.60 | 6.98 |
| Ex. 3 | 100 mA/g | 5.51 | 5.60 | 18.83 | 19.14 |
| | 40 mA/g | 5.65 | 6.06 | 19.33 | 20.72 |
| Ex. 5 | 100 mA/g | 0.68 | 0.74 | 1.98 | 2.17 |
| | 40 mA/g | 0.81 | 0.89 | 2.36 | 2.60 |

TABLE 4-continued

| | | Capacitance (F/g) | | | |
| --- | --- | --- | --- | --- | --- |
| | | Measured values | | Converted in terms of graphite | |
| | Current | (1.6-0.8 V) | (1.6-0.4 V) | (1.6-0.8 V) | (1.6-0.4 V) |
| Ex. 6 | 100 mA/g | 6.73 | 8.71 | 9.91 | 12.82 |
| | 40 mA/g | 7.09 | 7.59 | 10.43 | 11.17 |
| Comp. Ex. 1 | 100 mA/g | 0.34 | 0.32 | 0.43 | 0.40 |
| | 40 mA/g | 0.34 | 0.32 | 0.43 | 0.40 |
| Comp. Ex. 2 | 100 mA/g | 0.12 | 0.11 | 0.14 | 0.14 |
| | 40 mA/g | 0.12 | 0.11 | 0.15 | 0.14 |
| Comp. Ex. 3 | 100 mA/g | 4.53 | 5.81 | 5.59 | 7.17 |
| | 40 mA/g | 4.73 | 5.43 | 5.84 | 6.70 |

For the values converted in terms of graphite in Table 3 and Table 4, values obtained by converting capacitor capacitance per electrode in terms of the substantial weight of the exfoliated graphite excluding, from the total amount of the electrode, the polytetrafluoroethylene and the resin component of the resin-remaining partially exfoliated graphite used when the electrode is made is described.

For example, in Example 1, polytetrafluoroethylene corresponding to 10 wt % is used when the electrode is made. Therefore, the measured value, 108 F/g, was divided by 0.9 excluding the polytetrafluoroethylene. 25 wt % corresponded to the resin component from the TG/DTA measurement results (FIG. 1), and therefore the obtained value was further divided by 0.75 excluding the resin component to obtain the converted value: 160 F/g. In this manner, it was confirmed that the capacitance after conversion in terms of substantial graphite weight in the calculation range: 0.8-0.2 V and at a current value of 40 mA/g for Example 1 was a high value.

In contrast, in the GMA type, polytetrafluoroethylene corresponding to 10 wt % is used when the electrode is made. Therefore, the measured value, 185 F/g, was divided by 0.9 excluding the polytetrafluoroethylene. 60 wt % corresponded to the resin component from the TG/DTA measurement results (FIG. 5), and therefore the obtained value was further divided by 0.4 excluding the resin component to obtain the converted value: 514 F/g.

In this manner, it was confirmed that the capacitance after conversion in terms of substantial graphite weight in the calculation range: 0.8-0.2 V and at a current value of 40 mA/g for Example 2 was very high, 514 F/g.

The invention claimed is:

1. A capacitor electrode material comprising
    resin-remaining partially exfoliated graphite obtained by pyrolyzing a resin in a composition in which the resin is previously fixed to graphite or primary exfoliated graphite by grafting or adsorption, the resin-remaining partially exfoliated graphite having a structure in which graphite is partially exfoliated, with part of the resin remaining; and
    a binder resin,
    wherein when an amount of methylene blue adsorbed per g of the resin-remaining partially exfoliated graphite (µmol/g) is y, the amount of methylene blue adsorbed being measured based on a difference between an absorbance of a methanol solution of methylene blue at a concentration of 10 mg/L and an absorbance of a supernatant liquid obtained by introducing the resin-remaining partially exfoliated graphite into the methanol solution of methylene blue followed by centrifugation, and a BET specific surface area (m$^2$/g) of the resin-remaining partially exfoliated graphite is x, a ratio y/x is 0.15 or more, and the BET specific surface area of the resin-remaining partially exfoliated graphite is 40 m$^2$/g or more.

2. The capacitor electrode material according to claim 1, wherein a pyrolysis initiation temperature and a pyrolysis end temperature of the remaining resin in the resin-remaining partially exfoliated graphite are higher than a pyrolysis initiation temperature and a pyrolysis end temperature of the resin before the pyrolysis, respectively.

3. The capacitor electrode material according to claim 1, wherein the resin is at least one resin selected from a group consisting of polyglycidyl methacrylate, polypropylene glycol, polyvinyl acetate, polybutyral, and polyacrylic acid.

4. The capacitor electrode material according to claim 1, wherein the binder resin is polybutyral, polytetrafluoroethylene, or a fluorine-based polymer.

5. The capacitor electrode material according to claim 4, wherein the fluorine-based polymer is polyvinylidene fluoride.

6. The capacitor electrode material according to claim 1, comprising 0.3 to 40 parts by weight of the binder resin based on 100 parts by weight of the resin-remaining partially exfoliated graphite.

7. A method for producing a capacitor electrode material, comprising steps of:
    pyrolyzing a resin in a composition in which the resin is previously fixed to graphite or primary exfoliated graphite by grafting or adsorption to obtain resin-remaining partially exfoliated graphite which has a structure in which graphite is partially exfoliated and in which part of the resin remains; and
    incorporating a binder resin in the resin-remaining partially exfoliated graphite followed by forming into a capacitor electrode material.

8. The method for producing a capacitor electrode material according to claim 7, wherein the forming of the capacitor electrode material is performed by sheeting by a rolling roller followed by drying.

9. An electric double layer capacitor comprising the capacitor electrode material according to claim 1.

10. A capacitor electrode material comprising
    resin-remaining partially exfoliated graphite obtained by pyrolyzing a resin in a composition in which the resin is previously fixed to graphite or primary exfoliated graphite by grafting or adsorption, the resin-remaining partially exfoliated graphite having a structure in which graphite is partially exfoliated, with part of the resin remaining; and a binder resin,
wherein the resin-remaining partially exfoliated graphite has a central portion having a graphite structure and an edge portion having an exfoliated structure, and a BET specific surface area of the resin-remaining partially exfoliated graphite is 40 m$^2$/g or more.

* * * * *